US 7,389,674 B2

(12) United States Patent
Bulst et al.

(10) Patent No.: US 7,389,674 B2
(45) Date of Patent: Jun. 24, 2008

(54) SENSOR

(75) Inventors: Wolf-Eckhart Bulst, Munich (DE); Frank Schmidt, Zorneding (DE); Oliver Sczesny, Aschheim (DE)

(73) Assignee: EnOcean GmbH, Oberhachung (DE)

( * ) Notice: Subject to any disclaimer, the term of this patent is extended or adjusted under 35 U.S.C. 154(b) by 281 days.

(21) Appl. No.: 11/183,092

(22) Filed: Jul. 15, 2005

(65) Prior Publication Data
US 2006/0037380 A1 Feb. 23, 2006

Related U.S. Application Data

(63) Continuation of application No. PCT/DE2004/000034, filed on Jan. 14, 2004.

(30) Foreign Application Priority Data

Jan. 17, 2003 (DE) ................. 103 01 678

(51) Int. Cl.
*G01N 7/00* (2006.01)
*G01N 27/12* (2006.01)
(52) U.S. Cl. ............... 73/29.01; 73/335.03; 73/29.05
(58) Field of Classification Search ............ 73/29.01, 73/29.05, 335.03, 73
See application file for complete search history.

(56) References Cited

U.S. PATENT DOCUMENTS

| 4,396,149 A | 8/1983 | Hirsch |
| 4,516,565 A * | 5/1985 | Stone .................. 126/585 |
| 5,523,722 A * | 6/1996 | Nakano et al. .......... 331/107 A |
| 5,601,236 A | 2/1997 | Wold |
| 2001/0003163 A1 * | 6/2001 | Bungert et al. .............. 700/12 |

FOREIGN PATENT DOCUMENTS

| DE | 35 11 504 A1 | 10/1986 |
| DE | 199 52 602 C1 | 5/2001 |
| DE | 199 56 928 C2 | 5/2001 |
| DE | 100 19 112 A1 | 8/2001 |
| DE | 200 13 896 U1 | 2/2002 |
| EP | 0 918 212 A1 | 11/1998 |
| GB | 2 320 572 A | 6/1998 |
| JP | 08-308395 A | 11/1996 |
| JP | 09-022257 A | 1/1997 |

OTHER PUBLICATIONS

V. Raghunathan, et al., "Energy-Aware Wireless Microsensor Networks", IEEE Signal Processing Magazine, pp. 40-50, Mar. 2002.
A. Chandrakasan et al., "Power Aware Wireless Microsensor Systems", http://www.mit.edu/{rmin/research/chand-esscirc02.pdf, Sep. 2002.
K. Bult, et al., "Low Power System for Wireless Microsensors", Proceedings of International Symposium on Low Power Electronics and Design, XX, XX, pp. 17-21, Aug. 12, 1996.

* cited by examiner

*Primary Examiner*—Daniel S Larkin
(74) *Attorney, Agent, or Firm*—Cohen Pontani Lieberman & Pavane LLP

(57) ABSTRACT

An energy-autonomous sensor for detection of physical environmental parameters, having at least one sensor element, one storage element and one control circuit, with a timer circuit which is activated on reaching a predetermined electrical voltage on the storage element, activates the sensor and the control circuit at predetermined time intervals, and deactivates them after a predetermined operating time, such that this results in a time duration of sensor operation and a sensor operation pause.

7 Claims, 3 Drawing Sheets

SENSOR

RELATED APPLICATIONS

This is a continuation of International Application No. PCT/DE2004/000034, filed on Jan. 14, 2004, which claims priority from German Patent Application No. 103 01 678.3, filed on Jan. 17, 2003, the content of which is hereby incorporated by reference.

FIELD OF THE INVENTION

The invention relates to a sensor for detection of physical environmental parameters, having at least one sensor element, one storage element and one control circuit.

BACKGROUND OF THE INVENTION

Sensors, as well as energy-autonomous sensors, for detection of measurement values and other physical variables are known, for example, from EP 0918212 A1. This document discloses sensors which detect measurement values and pass on the measurement values to an evaluation device which is, in particular, central and operates on a computer-aided basis. The word "central" means that a plurality of sensors communicate with the same evaluation device. In order in this case to avoid complex, costly and visually highly disadvantageous wiring and an operating time which is limited in the case of battery and rechargeable battery operation and the need, associated with this, for the replacement and charging of the electrical power source at regular intervals, sensors, in particular temperature sensors, are proposed there, which detect measurement values and pass on the measurement values to an evaluation device which is, in particular, central and operates on a computer-aided basis, with the measurement values being passed on by means of radio transmission from a sensor device, which is connected to the sensor and has an antenna, to an evaluation device, and the transmission device being supplied with electrical power from an electrical power generator which converts the energy in the surrounding area.

In order to detect physical variables whose energy cannot sufficiently be converted to electrical energy, so that the sensor can thus be operated, such as moisture or humidity, it is necessary to convert other energy forms which are available at the location of a sensor to electrical energy, or to provide energy stores in situ, for example batteries or rechargeable batteries. In the case, for example, of the measurement of the moisture or humidity in the immediate vicinity, close to the ground, of a plant, it is not possible to assume that there is either sufficient thermal or kinematic energy for conversion to electrical energy, so that, for example, the light or solar energy must be used for conversion to electrical energy at this point.

The document U.S. Pat. No. 5,601,236 A discloses an apparatus for moistening and growth promotion of plants, in which this apparatus also has a moisture or humidity sensor, an energy store, a solar module and a control circuit, and an external timer starts a controller program which detects the amount of charge remaining in the system and/or in the energy store and determines the charge currently being supplied from the solar cells, with this being used to determine whether sufficient energy capacities are available in order to operate the various modules in the overall system. If sufficient energy is not available, the external timer is reset by a further period and the controller program causes all of the modules to return to a sleep mode until the time interval has elapsed once again and the check commences from the start.

The document GB 2320572 A discloses a plant moisture detector with a solar cell which operates an oscillator, which in turn detects the capacitive and/or resistive impedance of the ground via two separately running lines. This value is a measure of the moisture in the ground.

The document "Low Power System for Wireless Microsensors" Proceedings of International Symosium on Low Power Electronics and Design, XX, XX, 12 Aug. 1996, pages 17-21, XP001013406 by Bult, K. et al. discloses in a general form a network of wire-free sensors for applications in the transport field, production field, biomedical and environmental field and for safety and security systems. Numerous microsensors with a very low power consumption are connected to a central evaluation station via a radio link.

The document "Power Aware Wireless Microsensor Systems" ESSCIRC, September 2002, XP002288893 Florence, Italy published by Chandrakasan, A. et al. discloses a low power transmitter with a short starting time, which reduces the amount of energy required per transmitted bit of a radio link.

A system for measurement of moisture or humidity with radio transmission of the measurement values to a central evaluation device and with a solar energy power supply to the sensors is proposed in U.S. Pat. No. 4,396,149. In this case, a continuous measurement is carried out by means of the sensor, and energy is supplied continuously by means of a photovoltaic element. Photovoltaic elements of adequate size must be provided in order to provide an adequate power supply for the sensor element with radio transmission and for continuous measurement. This is not desirable and advantageous for all applications. If a sensor element is intended to provide its service in such a way that it is small, inconspicuous and reliable, in particular even at times when the light is poor, for example, at night, then neither the apparatus according to EP 0918212 A1 nor the apparatus according to U.S. Pat. No. 4,396,149 is suitable.

SUMMARY OF THE INVENTION

One object of the invention is to detect physical variables with an energy-autonomous sensor which is able to detect physical variables reliably and regularly even when only a weak supply, or at times no supply, of primary energy such as light which can be converted to electrical energy is available at the measurement location.

This and other objects are attained in accordance with one aspect of the invention directed to an energy-autonomous sensor for detection of physical environmental parameters, comprising one storage element for storage of electrical energy, one sensor element for detection of physical environmental parameters, one control circuit for coding of the detected physical environmental parameters, a photovoltaic element which is connected to the storage element in order to supply power to the sensor, and a timer circuit. The timer circuit which is activated upon a predetermined electrical voltage on the storage element being reached, activates the sensor element and the control circuit at a predeterminable time interval, and deactivates them after a predeterminable operating time, such that this results in a time duration of sensor operation and time duration of a sensor operation pause.

It is advantageous, particularly with regard to saving the available energy, to design the time duration of sensor operation to be considerably shorter than the time duration of the sensor operation pause.

One embodiment of the invention is a sensor which passes on information to other devices, for example, to a watering controller that is linked to a main electrical power system, or to a bus system. The energy for operation of the sensor and of the associated radio circuit is produced from the environmental light, so that no battery is required for operation. Both wire-based and radio-based systems can be used for transmission of the information. The use of radio-based information transmission from the sensor according to the invention to another device includes the advantage that, for example, no transmission lines need be arranged between the other device and the sensors.

In another embodiment of the invention, a photovoltaic element produces an electrical voltage when light is incident, in order to supply power to the sensor. This photovoltaic element is designed such that a voltage of about two volts is emitted even when the illumination intensities are low. Since the power that is produced is in general not sufficient for continuous operation of the sensor, a storage element, preferably at least one of a capacitor and an electrochemical energy store, is first of all charged with electrical energy.

When the electrical voltage on the storage element reaches a predetermined level, a timer circuit is activated which activates and deactivates the entire sensor at predetermined intervals. In one embodiment of the invention, the time intervals for activation and deactivation of the sensor are variable, and can be redefined by the control circuit on each activation. For this purpose, in particular, the state of charge of the storage element, optionally as well as the illumination intensity, is checked via the solar cell. Both or else only one of the two parameters are or is included in the redefinition of the time intervals. This allows the sensor to be operated for as long as possible even in darkness phases, that is to say in phases in which it is not feasible to supply energy from the environmental energy.

Furthermore, the photovoltaic element can additionally be used to measure the illumination intensity on each activation of the sensor. The illumination intensity can be transmitted together with an ID number of the sensor, the value of the measurement sensor, for example, the moisture or humidity measurement sensor.

In another embodiment of the invention, a radio-frequency transmitter and an antenna, which is connected to it emit the coded information and transmit it to other devices. In order to improve the transmission reliability, the radio signal for this transmission is advantageously designed to be redundant, that is to say it is transmitted using a wide bandwidth and/or in a time sequence.

The radio signal can be received, and is evaluated, by all of the associated radio-frequency receivers which are located in the vicinity. After the evaluation process, addressable receiver systems which are connected thereto react and in turn result in an action, such as opening of a watering device and/or control of an optical or acoustic signaling device, and/or feeding of the measurement data to a system for further storage and/or processing of the measurement data.

DETAILED DESCRIPTION OF THE DRAWINGS

Figure 1:
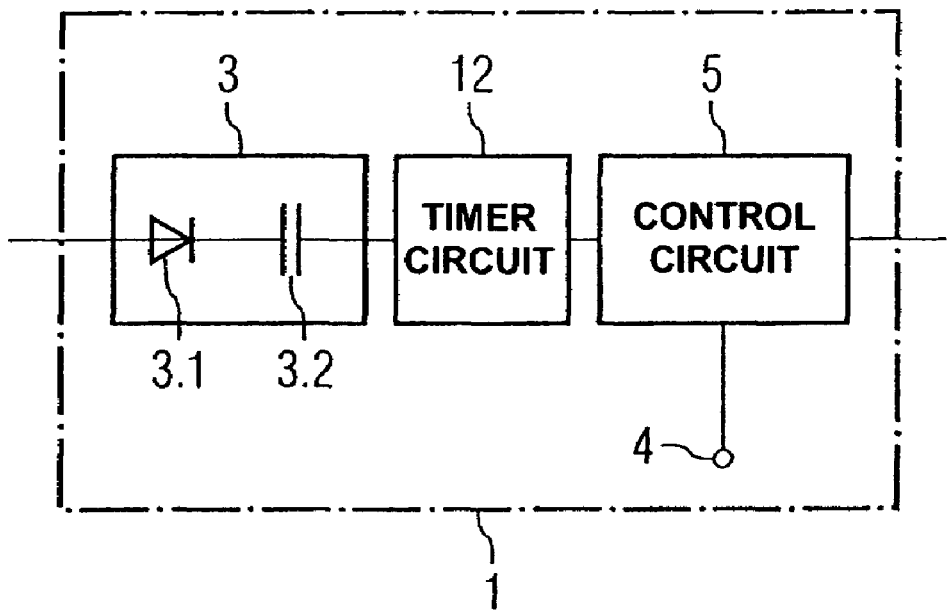
FIG. 1 shows an exemplary embodiment of the present invention, illustrated schematically.

FIG. 1 shows a sensor 1, illustrated schematically, with an electrical charge that is supplied to the sensor 1 being stored in a storage element 3. This storage element 3 is preferably formed from a low-loss capacitor 3.2 with a high capacitance. The storage element 3 advantageously contains a storage circuit 3.1 which, in a simple case, by way of example, comprises a semiconductor diode or a rectifier circuit. This is illustrated symbolically in FIG. 1 by the symbol of a diode. The storage circuit 3.1 in this case prevents charges from flowing back from the storage element 3 to a power supply device that is connected, but is not illustrated in FIG. 1. A further optional function of the storage circuit 3.1 is impedance matching between a power supply device and the storage element 3.

Figure 2:
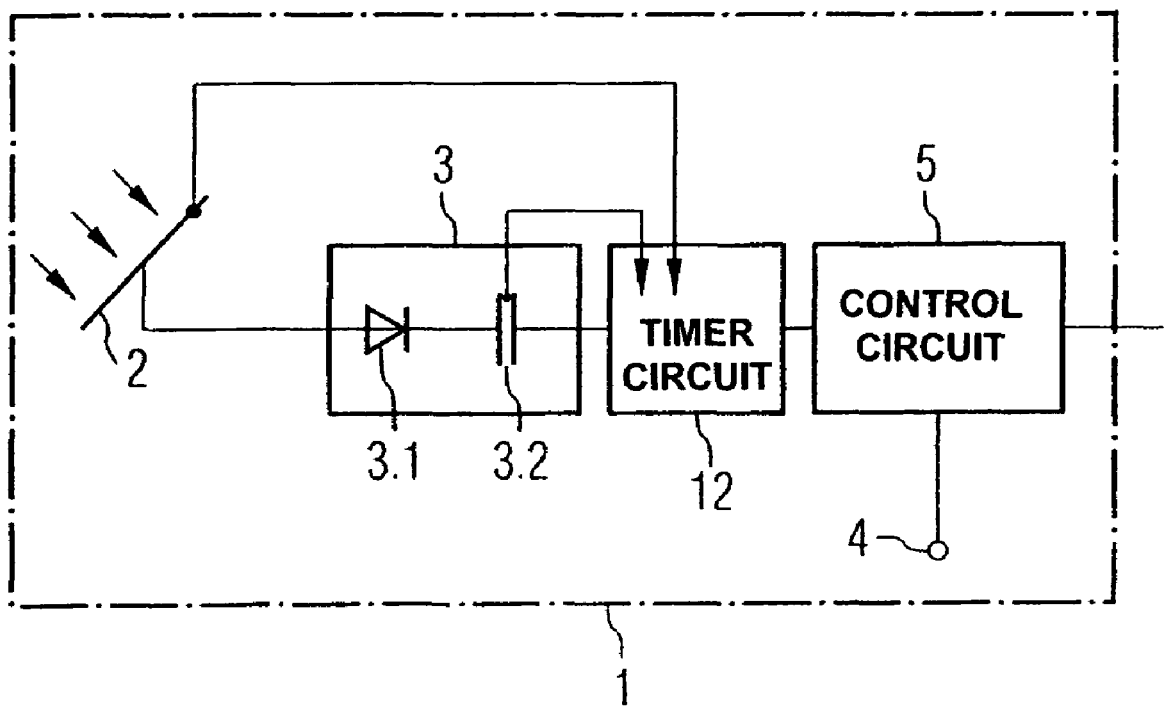
FIG. 2 shows a refinement of the sensor 1 with a photovoltaic element 2.

In an embodiment that is illustrated in FIG. 2, a photovoltaic element 2 is connected as the power supply device. The photovoltaic element 2 is preferably chosen to be sufficiently small to be able to achieve a very high degree of flexibility in terms of the choice of the point of use. Direct operation of the sensor 1 with the photovoltaic element 2 is thus impossible. The energy that is produced by the photovoltaic element 2 is collected in a storage device for operation of the sensor 1. In the exemplary embodiment illustrated in FIG. 2, a storage element 3 is supplied and filled with electrical charge by the light that is incident on the photovoltaic element 2.

The size of the low-loss capacitor 3.2 for the storage device 3 is selected in conjunction with the photovoltaic element or any other power supply device such that even extreme darkness phases, such as those which may occur by way of example at night, in particular during the winter months, can be reliably reconciled, that is to say the storage element 3 is supplied and can also store sufficient energy via the photovoltaic element 2 to allow timer operation and sensor operation to take place in time intervals, even during the darkness phase.

The timer circuit 12 which is illustrated in FIG. 1 is designed using ULP (ultra low power) technology, so that it can operate with extremely little energy consumption. For this purpose, the timer circuit 12 is designed using analogue or digital technology. The timer circuit 12 is the only component of the sensor 1 that is operated continuously. The timer circuit 12 activates the control circuit 5, with the sensor elements 4 connected to it, at regular, predetermined time intervals, and deactivates them after a predetermined operating time. In this case, the time duration of an operating phase of the sensor 1 is considerably shorter than the time duration of a pause in operation of the sensor 1.

In one advantageous embodiment, which is illustrated in FIG. 2, the timer circuit 12 activates the control circuit 5 as well as the sensor element 4 as a function of the state of charge of the storage element 3; and, optionally or additionally, also as a function of the illumination intensity at the photovoltaic element 2. Any sensor element which converts a physical variable to an electrical signal, and has the capability to pass this on to the control circuit 5, is suitable for use as the sensor element 4 for detection of the physical variable.

Figure 5:
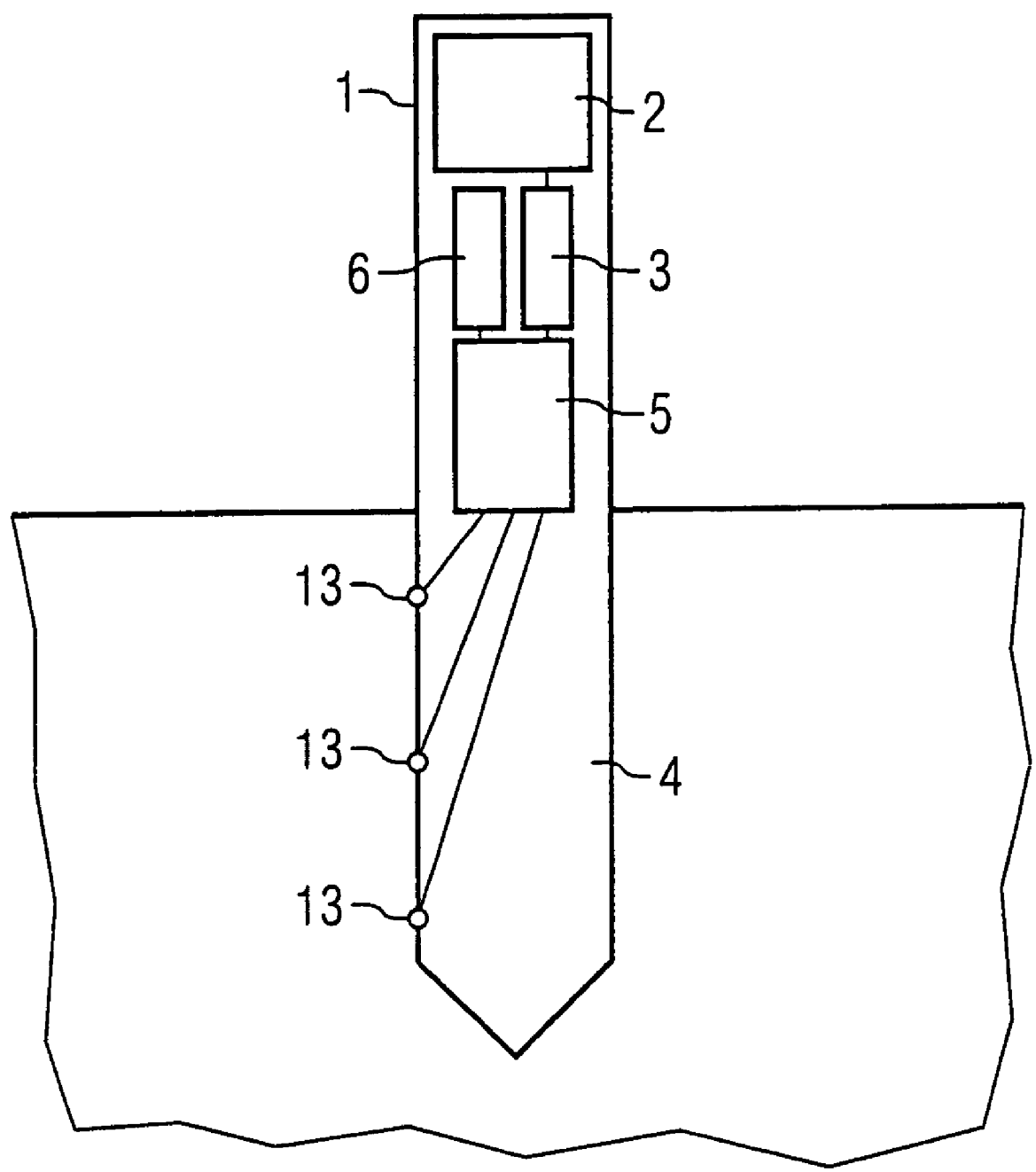
FIG. 5 shows an exemplary embodiment of the sensor 1 as a moisture or humidity sensor.

In one exemplary embodiment, which is illustrated in FIG. 5, an impedance measurement of the ground is preferably provided, by means of a number of electrodes, but at least two electrodes, for measurement of the moisture or humidity, in particular for measurement of the ground moisture.

Figure 3:
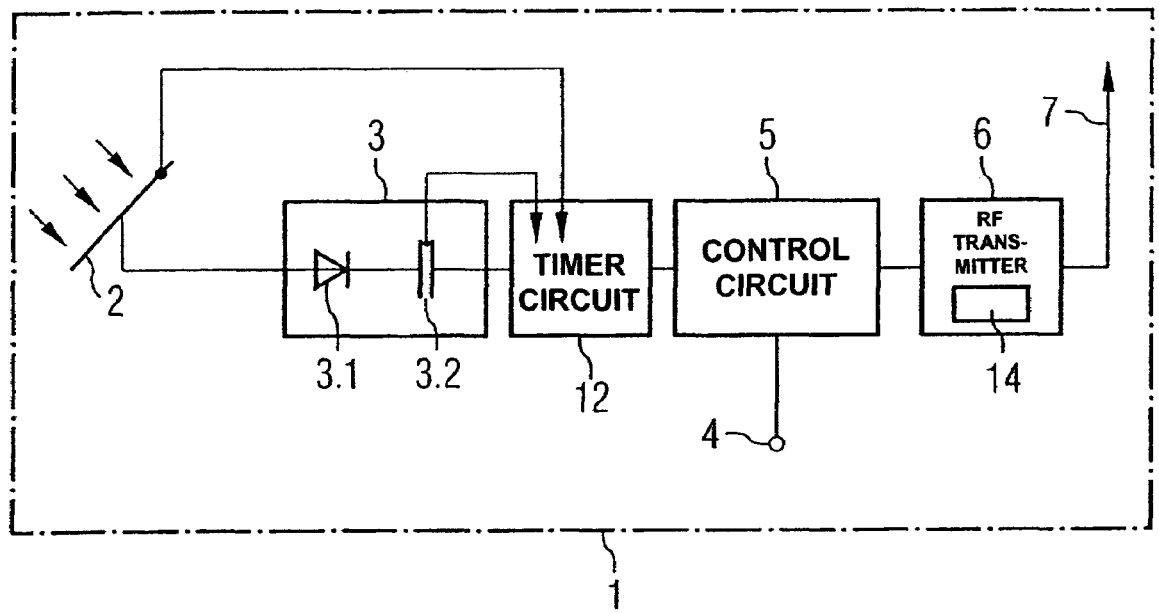
FIG. 3 shows an additional refinement of the sensor illustrated in FIG. 2 with a radio-frequency transmitter 6.

FIG. 3 shows a schematic illustration of one advantageous embodiment for radio-based transmission of the information that is detected by the sensor 1. In this case, the timer circuit 12 activates the control circuit 5 as well as the sensor element 4 and a radio-frequency transmitter 6 as a function of the state of charge of the storage element 3; and, optionally or additionally, also as a function of the illumination intensity at the photovoltaic element 2. The radio-frequency transmitter 6 is preferably equipped with a radio-frequency oscillator 14, which has a very fast transient response. In this case, a surface acoustic wave resonator may be used as the frequency-determining component. The radio-frequency transmitter modulates the information that is detected by the sensor 1 onto a radio-frequency signal or radio message.

In order to keep the energy consumption of the radio-frequency transmitter 6 low, it is designed to draw little current and operates with a wide bandwidth, in order to keep the transmission duration short. Owing to the wide bandwidth, this results in a short transmission time and thus in extended, low energy consumption. The radio-frequency signal or radio message is transmitted via the antenna 7 that is connected to the radio-frequency transmitter 6.

Figure 4:
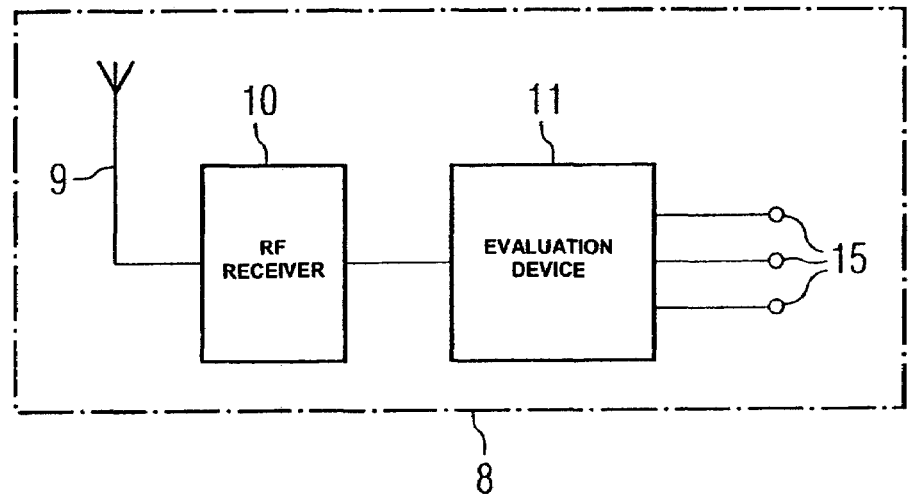
FIG. 4 shows a receiving device 8, illustrated schematically.

FIG. 4 shows a receiving device 8 for reception of the information that is transmitted from the radio-frequency transmitter, with this receiving device 8 having at least one antenna 9 for reception of the radio-frequency signal or radio message, and a radio-frequency receiver 10 which is connected to this antenna 9. This radio-frequency receiver 10 receives the signals transmitted from the sensor 1, demodulates them and passes them to an evaluation device 11. The evaluation device 11 has connections 15 to which further systems or actuators are connected. These are, for example, watering systems, signaling systems or other systems.

Error-tolerant transmission methods, such as parity check, forward error correction or block-oriented redundancy methods, are preferably used for data transmission. It is also possible to scramble the transmitted data using suitable electronic keys. The data is transmitted in a very short time and at predetermined time intervals. In this case, the transmission time is considerably shorter than the time in which no transmission takes place. This considerably reduces the collision probability of two sensors 1 transmitting at the same time.

Not only the measured physical parameter, but also further information that is produced at the sensor 1, may be used as the data contents for transmission, such as an ID number of the sensor 1, the temperature that occurs at the sensor 1, the illumination intensity at the sensor 1 at the time of transmission, the water level adjacent to the sensor 1, and many other possibilities.

Not only the measured physical parameter but also further information that is produced at the sensor 1 may be used as the data contents for transmission, such as an ID number of the sensor 1. The temperature that occurs at the sensor 1, the illumination intensity at the sensor 1 at the time of transmission, the water level adjacent to the sensor 1, and many other possibilities.

FIG. 5 shows one embodiment of a sensor 1 in the form of a rod with a photovoltaic element 2, a storage element 3, a control circuit 5 and a radio-frequency transmitter 6, whose measurement electrodes 13 are introduced into the ground or a water reservoir in order to measure the ground moisture via an impedance measurement. Modulated direct current or alternating current is preferably used for impedance measurement, with at least one frequency, but preferably two or more frequencies, being used when using alternating current. This type of impedance measurement makes it possible to determine the ground moisture with considerably better independence of the ground characteristics than a pure direct-current measurement.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

We claim:

1. An energy-autonomous sensor for detection of physical environmental parameters, comprising:
    a sensor element for detecting the physical environmental parameters;
    a control circuit for encoding the detected physical environmental parameters;
    a radio-frequency transmitter producing one of a radio-frequency signal and a radio message to transmit encoded physical environmental parameters and to transmit an ID-number of the sensor;
    a timer circuit which activates the control circuit, the sensor element and the radio-frequency transmitter at a predetermined time interval, and deactivates said control circuit and said sensor element and said radio-frequency transmitter after a predetermined period of operation, to define a time duration of operation and a time duration associated with an operational pause; and
    a photovoltaic element which is connected to a storage element to supply power to the storage element, the storage element being configured to store electrical energy and being connected to the timer circuit to provide electrical energy to at least one of the timer circuit, the control circuit, the sensor element and the radio-frequency transmitter;
    wherein the photovoltaic element is configured such that it is smaller than required for direct operation of the timer circuit, the control circuit, the sensor element and the radio-frequency transmitter.

2. The sensor as claimed in claim 1, wherein the time duration of the sensor element operation is substantially shorter than the time duration of the operational pause of the sensor element.

3. The sensor as claimed in claim 1, wherein on each activation of the control circuit, the predetermined time interval for activation of the control circuit is redefined as a function of a charge state of the storage element.

4. The sensor as claimed in claim 1, wherein the predetermined time interval for activation of the control circuit is redefined as a function of illumination intensity at the photovoltaic element at the time the control circuit is activated.

5. The sensor as claimed in claim 1, wherein the storage element is at least one of a capacitor and an electrochemical energy store.

6. The sensor as claimed in claim 1, wherein the sensor element detects moisture or humidity as the physical environmental parameter.

7. The sensor as claimed in claim 1, further comprising:
    at least two electrodes for performing a moisture or humidity measurement via an impedance measurement.

* * * * *